Aug. 7, 1951 P. E. BJORK 2,563,304
AUTOMATIC TEMPERATURE CONTROL APPARATUS
Filed March 4, 1944

Inventor:
Paul E. Bjork,
By Dawson, Ooms and Booth,
Attorneys.

Patented Aug. 7, 1951

2,563,304

UNITED STATES PATENT OFFICE 2,563,304

AUTOMATIC TEMPERATURE CONTROL APPARATUS

Paul E. Bjork, Forest Park, Ill., assignor to Lindberg Engineering Company, Chicago, Ill., a corporation of Illinois Application March 4, 1944, Serial No. 525,061

7 Claims. (Cl. 236—46)

This invention relates to control method and apparatus and more particularly to the control of a condition to maintain it at a desired value.

In the control of conditions, as for example, in controlling heat treating furnaces a substantial time lag occurs between a change in the rate of supply of heating medium to the furnace and a corresponding change in the saturation temperature of the furnace parts and the heating load therein. As used herein the term "saturation temperature" is taken to mean the temperature of the load mass and the mass of the furnace parts and the term "control temperature" is taken to mean the temperature of the space within the furnace as influenced by the heating means. To obtain stable control it is therefore necessary to anticipate the change which will be produced in the saturation temperature by a given change in the rate of heating medium supply and to compensate the control of the heating medium accordingly.

It is one of the objects of the present invention to provide a control apparatus in which the rate of supply of a conditioning medium is compensated in accordance with the difference between the existing rate of supply and the rate of supply eventually desired.

Another object of the invention is to provide a control apparatus in which the rate of supply of a conditioning medium is varied in accordance with the difference between the existing rate of supply and the existing value of a condition affected by the medium.

A more specific object of the invention is to vary the rate of heat supply to a furnace in accordance with the difference between the furnace control temperature and the saturation temperature of the furnace load.

Still another object of the invention is to provide a control apparatus including a reversible motor for adjusting a control instrument in which one winding is energized only when a conditioning factor is being supplied and the other winding is energized only when supply of the conditioning factor is interrupted.

The above and other objects and advantages of the invention will be more readily apparent from the following description when read in connection with the accompanying drawing, in which—

Figure 1:
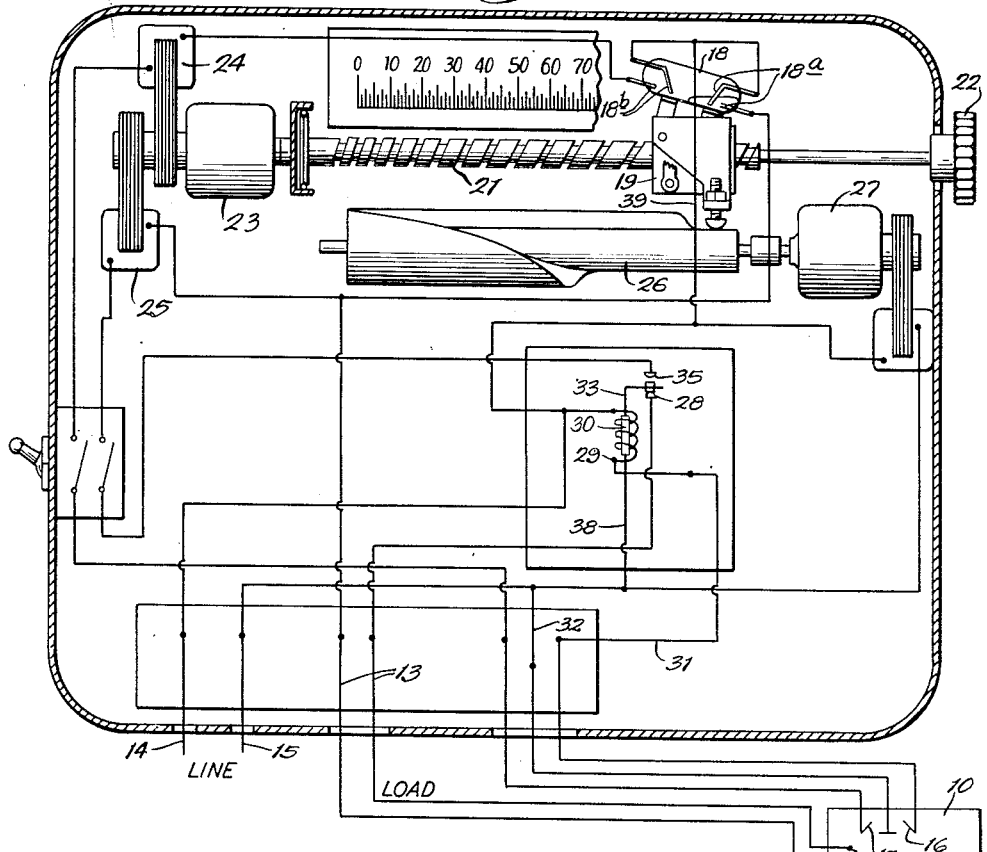
Figure 2:
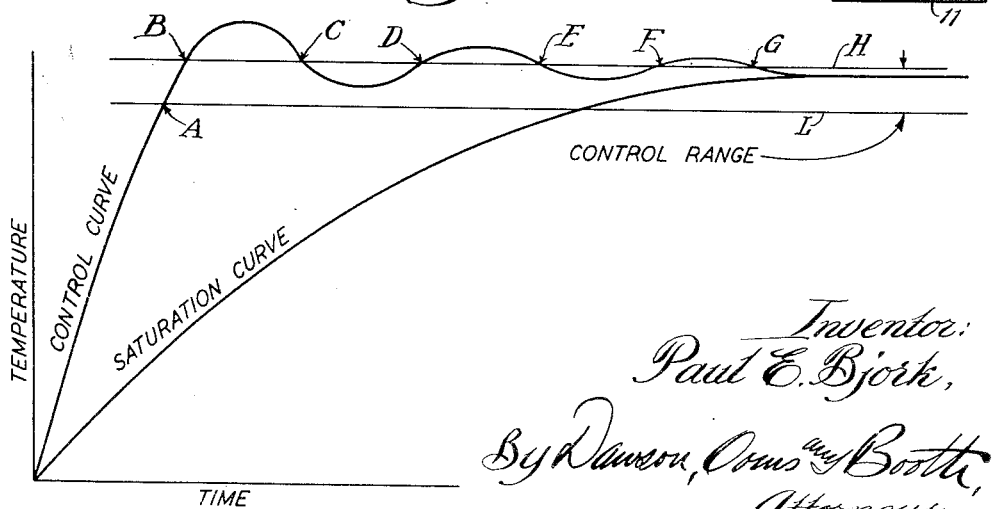

Figure 1 is a diagrammatic view of a control instrument embodying the invention; and Figure 2 is a chart illustrating typical control curves for a heating furnace controlled according to the invention.

Figure 1 illustrates one type of control instrument for effecting a temperature control in which the present invention has been embodied. This instrument is of the same general type more particularly described and claimed in the patents to Stevenson No. 2,193,845 and No. 2,193,846 and the present invention provides a means by which instruments of this type can be more quickly stabilized than heretofore. This instrument is shown controlling an electrically heated furnace 10 containing a load 11 and heated by heating units 12 connected to the leads 13 and supplied with current from the line-wires 14 and 15. It will be understood that the load 11 indicates diagrammatically the furnace parts and any material to be heated which is in the furnace. The furnace temperature controls a high pyrometer contact 16 which closes when the furnace temperature is above the desired value and a low pyrometer 17 which closes when the furnace temperature is below the desired value. Preferably the pyrometer contacts are so adjusted that there is a narrow range when they are both open, the desired values referred to being the boundaries of such narrow range.

Control of the load is effected through a two-position mercury switch 18 having a set of "on" contacts 18a and a set of "off" contacts 18b and mounted on a carriage 19 which is movable along a screw or spiral 21. The spiral 21 may have a varying pitch along its length as shown to feed the carriage more rapidly at its right or high end than at its left or low end. The spiral 21 may be adjusted by hand through a knob 22 but is normally automatically controlled by a reversible motor 23 having an upscale winding 24 and a downscale winding 25 for driving it in opposite directions. The motor may be connected to the screw through a friction clutch as shown which will slip during manual adjustment of the spiral. The switch 18 is controlled by an elongated cam 26 parallel to the screw 21 and so shaped that when the switch is adjacent the right end of the cam as shown, it will occupy its "on" position a greater percentage of the time. At the extreme right end of the cam the switch will occupy its "on" position as shown in Figure 1, one-hundred percent of the time, while at its extreme left position, the switch will be tilted to its "off" position one-hundred percent of the time. The cam 26 is continuously driven by a motor 27 connected directly to the line-wires 14 and 15. As shown, the cam 26 varies along a straight line but it will be understood that it could be shaped to vary along any desired curve to vary the characteristics of the instrument.

The right load line 13 is connected to a relay contact 28 while the left line is connected to one of the contacts 18a at the "on" side of the mercury switch 18. The other contact at the "on" side of the mercury switch 18 and one of the contacts 18b at the "off" side of the switch are connected through a common lead 39 to the line-wire 14. The line wire 14 is connected through relay coil 29 to the pyrometer contact 16. The other contact at the "off" side of the switch is connected through the upscale winding 24 and through a manual switch 41 to the pyrometer switch 17. The neutral pyrometer contact is connected through a wire 32 to the line-wire 15 and the remaining "on" side contact 18a of the switch 18 is connected through the downscale winding 25 and the manual switch 41 to the relay contact 35. The relay contacts 28 and 35 are adapted to be engaged by a contact 33 normally engaging contact 28 but moved into engagement with contact 35 when the coil 29 is energized to raise core 30. The contact 33 is connected through a flexible lead 38 to the line-wire 15.

In operation, the motor 27 normally runs continuously, rotating the cam 26 so that the switch 18 will be moved back and forth from its "on" to its "off" position intermittently and will occupy the respective positions different percentages of time depending upon the adjustment of the carriage 19 along the cam. When the switch is in its "on" position with contacts 18a closed as shown, the load will be energized by a circuit from the line-wire 14 through the "on" side of the switch and directly back to the load line on the left through the heating elements and back through the right hand load line 13 through the contacts 28 and 33 and lead 38 to the line-wire 15. The switch will occupy its "on" position a percentage of the total elapsed time which is dependent upon the position of the carriage 19 along the cam. Thus the average rate of heat supply to the furnace will be varied as the carriage 19 is moved by operation of the motor 23.

When the pyrometer contact 16 closes in response to a temperature above the desired value to decrease the rate of heat supply, a circuit will be established through the coil 29 to move contact 33 into engagement with contact 35 and out of engagement with contact 28 to interrupt the circuit to the heating coil 12. This establishes a circuit through the downscale winding 25 of the motor 23 from the line 14 through the "on" side of the switch 18 through the winding 25, switch 41, contacts 35 and 33 and wire 38 to the opposite line wire 15. It will be noted that the "on" side of the switch 18 is in series in this circuit so that the winding 25 will be operative to turn the screw 21 in a direction to move the carriage 19 to the left only when the switch 18a is in its closed position.

When the pyrometer contact 17 closes indicating that the furnace control temperature is too low, the carriage 19 will be adjusted to the right to increase the percentage of time that the switch 18 is closed thereby to increase the rate of heat supply to the load. For this purpose a circuit will be completed from the line-wire 14 through the left hand or "off" contacts 18b of the switch 18, the winding 24, the manual switch 41, the pyrometer contact 17 and the lead 32 to the line-wire 15. In this circuit the left hand or "off" contacts 18b of the switch 18 are in series with the motor winding 24 so that the winding will be energized only when the switch is tilted to its "off" position in which supply of current to the load is interrupted.

The operation of the control in connection with a batch type heat treating furnace is illustrated in the curves of Figure 2. The instrument is set to maintain the control temperature in the indicated control range by setting the contact 17 to close when the temperature is below the bottom line L and the contact 16 to close when the temperature is above the upper line H. The furnace control temperature and the saturation temperature will initially be substantially equal and at a point considerably below the control range. When the control is turned on, therefore, the contact 17 will close and the carriage 19 will move to the right end of the scale to supply heat to the furnace at a 100 percent rate, which means that the contacts 18a will be closed continuously and the heating elements 12 will be energized continuously. When the carriage reaches its 100 percent position at the right end of the scale the motor winding 24 may be interrupted by a limit switch, not shown. At this time the control temperature will rise sharply as indicated by the first part of the control curve and the saturation temperature of the load will rise more slowly, as indicated by the more gradual rise of the saturation curve.

When the temperature in the furnace reaches the point A at the lower limit of the control range, the contact 17 will be opened but the heating rate will remain at 100 percent since the position of the carriage 19 is not immediately changed. Upon a further increase of the control temperature to point B the contact 16 will close to energize the downscale motor winding 25 to move the carriage to the left and decrease the heating rate. The downscale winding 25 is connected through the switch contacts 18a which are closed 100 percent of the time initially so that the initial adjustment of the carriage toward its downscale position will be very rapid. Closing of contact 16 also interrupts the heat supply to the furnace which remains off until contact 16 again opens.

The carriage will continue to be adjusted downscale and the supply of heat to the furnace will remain interrupted until the control temperature reaches the point C on the curve when the contact 16 opens. It will be noted that the control curve is rising sharply at point B and that the control temperature is substantially above the saturation temperature so that heat will be absorbed at a rapid rate to reduce the control temperature to point C on the control curve. At this time when there is a substantial difference between the control and saturation temperatures the carriage is moved rapidly to make a relatively large adjustment in the heating rate.

In this part of the control operation when the temperature drop in the furnace is rapid due to the large difference between the control and saturation temperatures, it is necessary to move the carriage downscale rapidly in order to reset the heat supply properly. With the control of the present invention, when the high contact 16 closes it indicates that the rate of heat supply is greater than needed to maintain the desired furnace temperature. Therefore, closing of this contact operates the control to interrupt the heat supply and to move the carriage downscale at a rapid rate to reduce the rate of heat supply to a new value.

In effect the motor which drives the carriage integrates the time the control temperature is above the control zone and adjusts the rate of heat supply accordingly. Since the temperature drop in the part of the control operation between points B and C is rapid the adjustment of the heat supply rate must be made rapidly or the total adjustment made will be less than the desired amount. In subsequent operations when the control and saturation temperatures are more nearly equal and temperature changes occur more slowly, adjustments of the heat supply rate will also be made more slowly as will appear hereinafter. Thus operation of the control of the present invention follows very closely the theoretical ideal control.

At point C heat is again supplied to the furnace at the new heating rate established by the new position of the carriage. Normally this is still above the heating rate eventually required so the control temperature will rise quickly until point D when the heat supply is again interrupted. As shown the control temperature did not drop below the lower limit of the control range between points C and D. This is the normal operation but if the control temperature should drop below L to close contact 17 the carriage would be adjusted upscale only a very slight amount. This is because the upscale winding is effective only when contacts 18b are closed which is a small percentage of the time when the heating rate is high as indicated by the position of the carriage near the right end of the scale.

At point D the heat supply is again interrupted and the carriage will again be moved downscale to further reduce the heating rate. Between points D and E the rate of heat supply is again being reduced but at a slower rate since contacts 18a are closed a smaller percentage of the time than between B and C since there is less difference between the control and saturation temperatures and the rate of heat absorption is slower. Therefore, even though the time interval between D and E is substantially the same as that between B and C a much smaller adjustment of the heating rate will be made.

At point E the contact 16 will again close to supply heat to the furnace at the new heating rate until the control temperature again rises above the control range at F. Between F and G a very slow adjustment of the carriage 19 and the heating rate will be produced since the carriage has by this time been adjusted to the point where the contacts 18a are closed only a relatively small percentage of the time. By this time the saturation temperature has nearly reached the control temperature and the instrument is making its small final adjustment.

When the control temperature reaches point G the contact 16 again opens. At this time the saturation temperature substantially equals the control temperature and the heating rate is equal to the radiation losses of the furnace. Both the control temperature and saturation temperature are now at a steady value within the control range and no further adjustments of the instrument will occur until conditions are changed to disturb the balance.

Thus it will be seen that when rapid adjustments in the heating rate are required, as when the control and saturation temperatures differ widely, a rapid adjustment is produced. When the saturation and control temperatures are nearly equal the adjustments are slow so that overshooting is eliminated. By this means the control is very quickly brought to a stable condition with a minimum of cycling and will thereafter maintain conditions stable at the desired set value.

Any change in control conditions, for example, a change in the control range, will produce a repetition in whole or in part of the cycle described above. At all times, however, when the instrument is set for a low heating rate, decreases in the rate setting will be made slowly and increases will be made rapidly and when the instrument is set for a high heating rate, increases will be made slowly and decreases will be made rapidly. Such changes are in all cases proportional to the difference between the control and saturation temperatures and are such as to stabilize the control in a minimum time.

While one embodiment of the invention has been shown and described in detail herein, it will be understood that this is illustrative only and is not intended as a definition of the scope, reference being had for this purpose to the appended claims.

This application is a continuation in part of my copending application, Serial No. 473,626, filed January 26, 1943, now abandoned.

What is claimed is:

1. Control apparatus comprising a two position switch having two circuit closing positions, cam means periodically to move the switch from one position to the other, a reversible motor having upscale and downscale windings, said windings when energized causing the motor to adjust the switch thereby to vary the control thereof by the cam means, means controlled by the switch to control the supply of a conditioning factor, means responsive to a condition affected by said factor selectively to connect the windings in circuit, one of the windings being in series with the switch in one position and the other of the windings being in series with the switch in its other position.

2. Control apparatus comprising a two position switch having two circuit closing positions, an elongated cam engageable with the switch to shift it from one position to the other and variably shaped along its length to vary the time the switch is in its separate positions, means for shifting the switch along the cam, a reversible motor having upscale and downscale windings adapted when energized to drive the shifting means upscale and downscale respectively, the windings being in series respectively with the switch in its two positions, means controlled by the switch to control the supply of a conditioning factor, and means responsive to a condition affected by said factor selectively to connect the windings in circuit.

3. Control apparatus comprising control means adjustable upscale and downscale to vary the supply of a conditioning factor, means responsive to a condition affected by the factor to adjust the control means upscale or downscale to vary the rate of supply of the factor, and means operated by the control means and controlling the last named means to cause the last named means to adjust the control means according to different predetermined effective rates of change upscale and downscale.

4. Control apparatus comprising control means adjustable upscale and downscale to vary the supply of a conditioning factor, a reversible motor connected to the control means to adjust it upscale or downscale, means responsive to a condition affected by the factor to control the direction of operation of the motor, and means operated by the control means to control the effective rate of operation of the motor in accordance with the existing adjustment of the control means.

5. Control apparatus comprising control means adjustable upscale and downscale to vary the supply of a conditioning factor, a reversible motor connected to the control means to adjust it upscale or downscale, means responsive to a condition affected by the factor to control the direction of operation of the motor, and means operated by the control means and controlling the motor to cause it to adjust the control means at different predetermined effective rates upscale and downscale.

6. Control apparatus comprising cyclically operable control means controlling the supply of a conditioning factor and having an on position and an off position, means responsive to a condition affected by the factor to adjust the control means to vary the percentages of a cycle in which it is in its on and off positions, means operated by the control means to prevent its adjustment to increase the percentage of a cycle it is in its on position except when it is in its off position, and means operated by the control means to prevent its adjustment to increase the percentage of a cycle it is in its off position except when it is in its on position.

7. Control apparatus comprising cyclically operable control means controlling the supply of a conditioning factor and having an on position and an off position, a reversible motor connected to the control means to adjust it thereby to vary the percentages of a cycle the control means is in its on and off positions, means responsive to a condition affected by the factor to control the direction of operation of the motor, and means responsive to the control means to prevent operation of the motor in one direction except when the control means is in its on position and to prevent operation of the motor in the other direction except when the control means is in its off position.

PAUL E. BJORK.

REFERENCES CITED

The following references are of record in the file of this patent:

UNITED STATES PATENTS

| Number | Name | Date |
|---|---|---|
| 1,795,753 | Bonn | Mar. 10, 1931 |
| 2,045,438 | Cioffi | June 23, 1936 |
| 2,119,061 | Stein et al. | May 31, 1938 |
| 2,259,877 | Cary | Oct. 21, 1941 |
| 2,282,726 | Jones | May 12, 1942 |
| 2,285,204 | Hall et al. | June 2, 1942 |
| 2,322,942 | Lange | June 29, 1943 |
| 2,363,413 | Guenzel et al. | Nov. 21, 1944 |
| 2,394,061 | Horstkotte | Feb. 5, 1946 |
| 2,409,136 | Lilja | Oct. 8, 1946 |

FOREIGN PATENTS

| Number | Country | Date |
|---|---|---|
| 450,479 | Great Britain | July 20, 1936 |